United States Patent
Lin et al.

(10) Patent No.: US 8,078,095 B2
(45) Date of Patent: Dec. 13, 2011

(54) DATA COMMUNICATION SYSTEM AND DATA COMMUNICATION METHOD

(75) Inventors: Yung-Da Lin, Chung Ho (TW);
Sheng-Cheng Chang, Chung Ho (TW);
Yu-Hsiang Chen, Chung Ho (TW);
Kuan-Yu Liu, Chung Ho (TW)

(73) Assignee: Avermedia Technologies, Inc., Chung Ho, Taipei Hsien (TW)

( * ) Notice: Subject to any disclaimer, the term of this patent is extended or adjusted under 35 U.S.C. 154(b) by 454 days.

(21) Appl. No.: 12/403,630

(22) Filed: Mar. 13, 2009

(65) Prior Publication Data
US 2010/0184385 A1 Jul. 22, 2010

(30) Foreign Application Priority Data
Jan. 22, 2009 (TW) .............................. 98102554 A

(51) Int. Cl.
*H04H 20/74* (2008.01)
(52) U.S. Cl. .................. 455/3.02; 455/188.1; 455/334
(58) Field of Classification Search .................. None
See application file for complete search history.

(56) References Cited

U.S. PATENT DOCUMENTS

| | | | | |
|---|---|---|---|---|
| 5,550,579 A | * | 8/1996 | Martinez | 725/123 |
| 7,697,069 B2 | * | 4/2010 | Choi | 348/555 |
| 2004/0168200 A1 | * | 8/2004 | Richter et al. | 725/127 |
| 2004/0245995 A1 | * | 12/2004 | Williams | 324/512 |
| 2005/0130582 A1 | | 6/2005 | Woodford | |

FOREIGN PATENT DOCUMENTS

| | | |
|---|---|---|
| EP | 0 505 038 | 9/1992 |
| GB | 2 300 319 | 10/1996 |
| JP | 10210458 | 8/1998 |

OTHER PUBLICATIONS

English language translation of abstract of JP 10-210458 (published Aug. 7, 1998).

* cited by examiner

*Primary Examiner* — Tuan T Lam
(74) *Attorney, Agent, or Firm* — Thomas, Kayden, Horstemeyer & Risley, LLP

(57) ABSTRACT

A data communication system and a data communication method are provided. The data communication system comprises a bidirectional cable, an antenna, a receiving and a function circuit block. The bidirectional cable transfers data through a high and a low frequency band. The antenna is to receive and transfer the analog data signal through the high frequency band of the bidirectional cable. The receiving circuit block comprises a receiving module to receive the analog data signal from the high frequency band and converts the analog data signal into a digital data to a host and a first control signal processing module to couple a control signal to the low frequency band. The function circuit block comprises a second control signal processing module to decouple the control signal from the low frequency band and a function module to perform an adjustment on the data communication system according to the control signal.

9 Claims, 5 Drawing Sheets

DATA COMMUNICATION SYSTEM AND DATA COMMUNICATION METHOD

RELATED APPLICATIONS

This application claims priority to Taiwan Application Serial Number 98102554, filed Jan. 22, 2009, which is herein incorporated by reference.

BACKGROUND

1. Field of Invention

The present invention relates to a data communication system. More particularly, the present invention relates to a data communication system and a data communication method.

2. Description of Related Art

Data communication system, especially wireless data communication system, is common to our daily life. The receiving circuit block of a data communication system in a computer system receives the wireless signal, such as a satellite TV signal, through the antenna. The circuit board of the data communication system on a smaller computer system such as a notebook or a barebone computer often has a smaller area as well. Thus, besides the circuit board (as motherboard) of the receiving circuit block, another circuit board (as daughterboard) is needed if an additional function circuit block is present. Please refer to FIG. 1. FIG. 1 is a block diagram of a conventional data communication system 1. The data communication system 1 comprises an antenna 10, a first cable 12, a receiving circuit block 14 and a function circuit block 16. The receiving circuit block 14 and the function circuit block 16 are placed on two separated boards. The receiving circuit block 14 receives the analog data signal 11 from the antenna 10 through the first cable 12 and further converts the analog data signal 11 into a digital data 13. After the conversion, the receiving circuit block 14 transfers the digital data 13 to the host 18. However, the host 18 needs a second cable 12' between the host and the function circuit block 16 to send the control signal 15 to control the function circuit block 16. Thus, to a smaller computer system, the second cable 12' is an additional spatial cost, which is an undesirable result.

Accordingly, what is needed is a data communication system and a data communication method that are able to transfer the control signal without increasing the spatial cost of the system. The present invention addresses such a need.

SUMMARY

A data communication system is provided. The data communication system comprises a bidirectional cable, an antenna, a receiving and a function circuit block. The bidirectional cable is to transfer data through a high frequency band and a low frequency band. The antenna is to receive an analog data signal and transfer the analog data signal through the high frequency band of the bidirectional cable. The receiving circuit block comprises a receiving module to receive the analog data signal from the high frequency band and converts the analog data signal into a digital data to a host and a first control signal processing module to couple a control signal to the low frequency band. The function circuit block comprises a second control signal processing module to decouple the control signal from the low frequency band and a function module to further perform an adjustment on the data communication system according to the control signal.

Another object of the present invention is to provide a data communication system. The data communication system comprises a bidirectional cable, an antenna, a receiving and a function circuit block. The bidirectional cable is to transfer data through a high frequency band and a low frequency band. The antenna is to receive an analog data signal and transfer the analog data signal through the high frequency band of the bidirectional cable. The function circuit block comprises a function module to generate a control signal and a second control signal processing module to couple a control signal to the low frequency band. The receiving circuit block comprises a receiving module to receive the analog data signal from the high frequency band and converts the analog data signal into a digital data to a host and a first control signal processing module to decouple the control signal from the low frequency band to make the host perform an adjustment on the data communication system according to the control signal.

Yet another object of the present invention is to provide a data communication method adapted in a data communication system, wherein the data communication system comprises an antenna, a receiving circuit block, a function circuit block and a bidirectional cable connected between the receiving and the function circuit block. The data communication method comprises the steps of: receiving an analog data signal through the antenna and further transferring the analog data signal through a high frequency band of the bidirectional cable; receiving the analog data signal from the high frequency band and converting the analog data signal into a digital data to a host; coupling a control signal from the receiving circuit block to the low frequency band; decoupling the control signal from the low frequency band to the function circuit block; and performing an adjustment on the data communication system according to the control signal.

Further, another object of the present invention is to provide a data communication method adapted in a data communication system, wherein the data communication system comprises an antenna, a receiving circuit block, a function circuit block and a bidirectional cable connected between the receiving and the function circuit block. The data communication method comprises the steps of: receiving an analog data signal through the antenna and further transferring the analog data signal through a high frequency band of the bidirectional cable; receiving the analog data signal from the high frequency band and converting the analog data signal into a digital data to a host; coupling a control signal from the function circuit block to the low frequency band; decoupling the control signal from the low frequency band to the receiving circuit block; and performing an adjustment on the data communication system according to the control signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
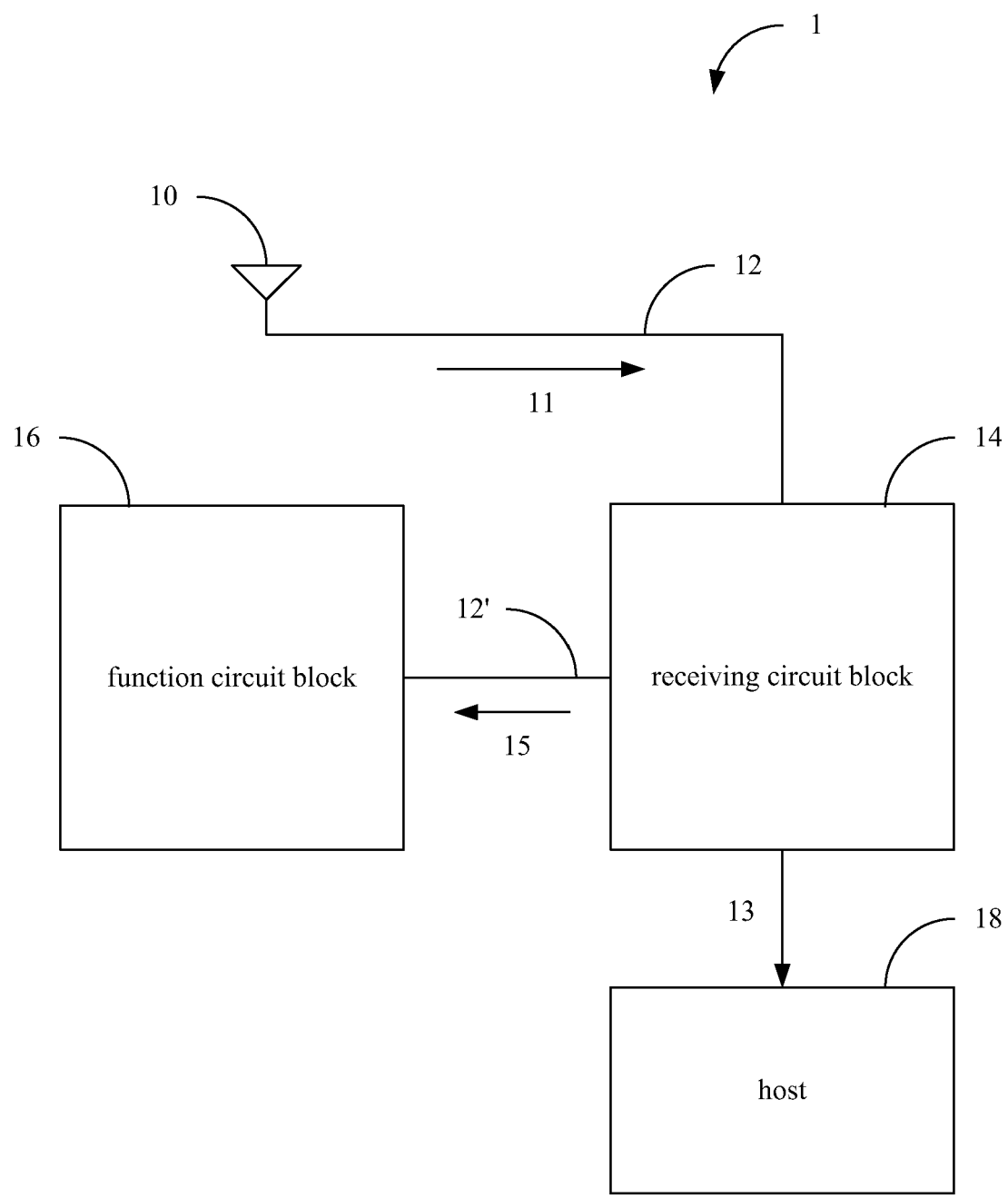
FIG. 1 is a block diagram of a conventional data communication system.

Reference will now be made in detail to the present embodiments of the invention, examples of which are illustrated in the accompanying drawings. Wherever possible, the same reference numbers are used in the drawings and the description to refer to the same or like parts.

Figure 2:
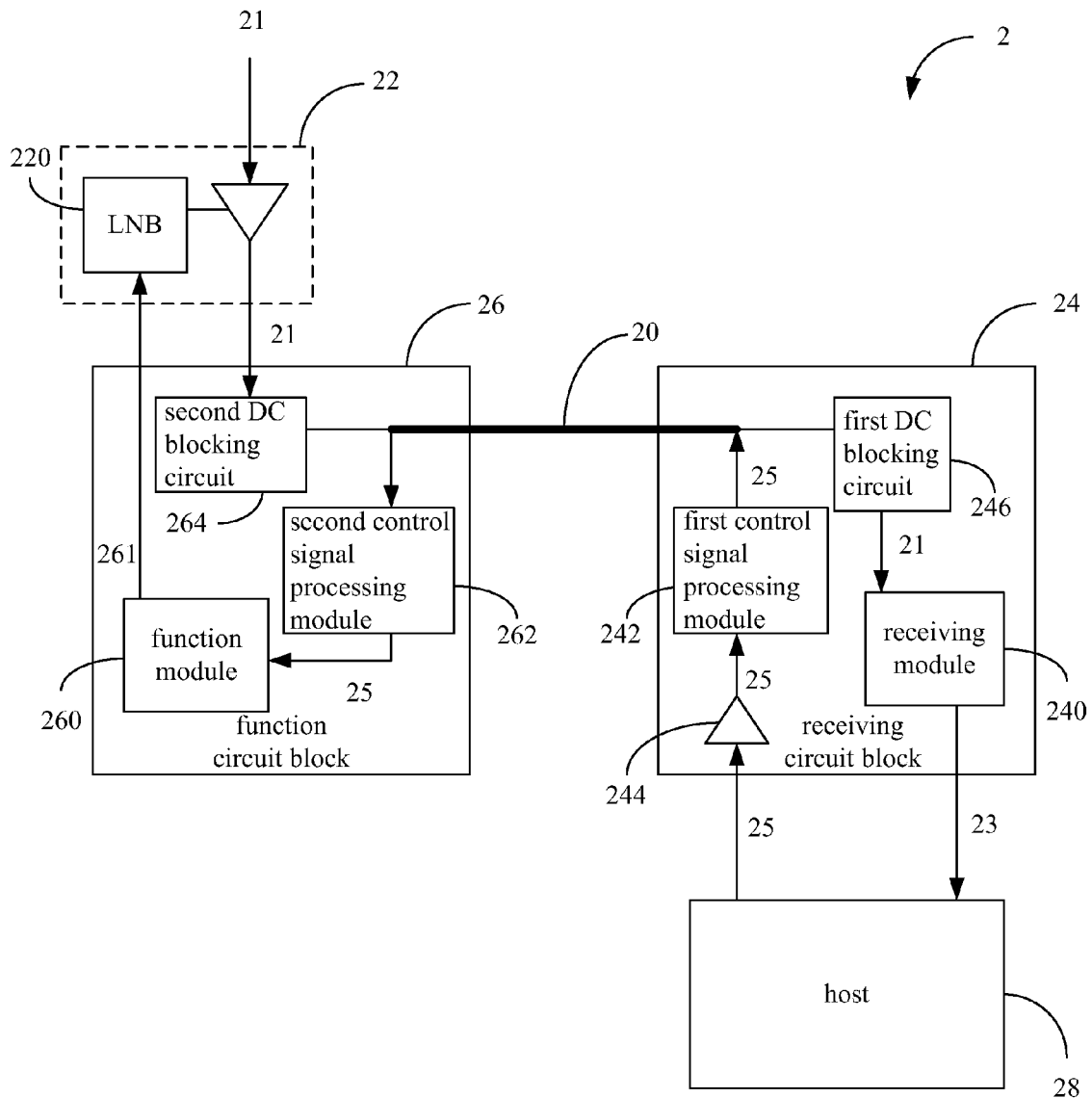
FIG. 2 is a block diagram of a data communication system of the first embodiment of the present invention.

Please refer to FIG. 2. FIG. 2 is a block diagram of a data communication system 2 of the first embodiment of the present invention. The data communication system 2 comprises a bidirectional cable 20, an antenna 22, a receiving circuit block 24 and a function circuit block 26. The bidirectional cable 20 is to transfer data through a high frequency band and a low frequency band. The antenna 22 is to receive an analog data signal 21. In an embodiment, the data communication system 2 is a system to receive the satellite TV data signal. Thus, the analog data signal 21 is the image data of the satellite TV. The antenna 22 transfers the analog data signal 21 through the high frequency band of the bidirectional cable 20. The receiving circuit block 24 and the function circuit block 26 in the present embodiment are placed on two different circuit boards (not shown) and connected to each other only through the bidirectional cable 20. The receiving circuit block 24 comprises a receiving module 240 and a first control signal processing module 242. The receiving module 240 is to receive the analog data signal 21 from the high frequency band and converts the analog data signal 21 into a digital data 23 to a host 28. The host 28 in the present embodiment generates a control signal 25. A buffer 244 is substantially placed between the first control signal processing module 242 and the host 28. The host 28 sends the control signal 25 to the first control signal processing module 242 through the buffer 244. It's noticed that the buffer 244 is to increase the driving ability of the control signal 25. It the driving ability of the control signal 25 from the host 28 is high enough, the buffer 244 is not necessary. After the first control signal processing module 242 receives the control signal 25, the first control signal processing module 242 further couples the control signal 25 to the low frequency band of the bidirectional cable 20. The first control signal processing module 242 is an inductor or other circuit that can perform coupling process to couple the control signal 25 to the low frequency band of the bidirectional cable 20.

The function circuit block 26 connected to the other side of the bidirectional cable 20 comprises a second control signal processing module 262 and a function module 260. The second control signal processing module 262 is to decouple the control signal 25 from the low frequency band of the bidirectional cable 20. The second control signal processing module 262 is a low pass filter to block the high frequency part of the signal of the bidirectional cable 20. The second control signal processing module 262, like the first control signal processing module 262, can be an inductor in the present embodiment to decouple the control signal 25. The second control signal processing module 262 further transfer the control signal 25 to the function module 260. The function module 260 further performs an adjustment on the data communication system 2 according to the control signal 25. In the present embodiment, the function module 260 is a power module to perform a power adjustment on the power 261 of a low noise block (LNB) 220 of the antenna 22. The power adjustment further controls the angle and the power of the antenna 22.

In the present embodiment, a first DC blocking circuit 246 is connected between the receiving module 240 and the bidirectional cable 20 to block a direct current between the receiving module 240 and the bidirectional cable 20. A second DC blocking circuit 264 is connected between the antenna 22 and the bidirectional cable 20 to block a direct current between the antenna 22 and the bidirectional cable 20. The DC blocking mechanism is to avoid the interference from the DC current. The first and the second DC blocking circuit 246 and 264 can be a capacitor or other device that can block the DC current respectively.

The data communication system of the present embodiment makes use of the low frequency band of the bidirectional cable to couple the control signal. Thus, only one cable between the function circuit block and the receiving circuit block is needed to avoid the additional spatial cost. It's noticed that the function module of the function circuit block can be different in other embodiments.

Figure 3:
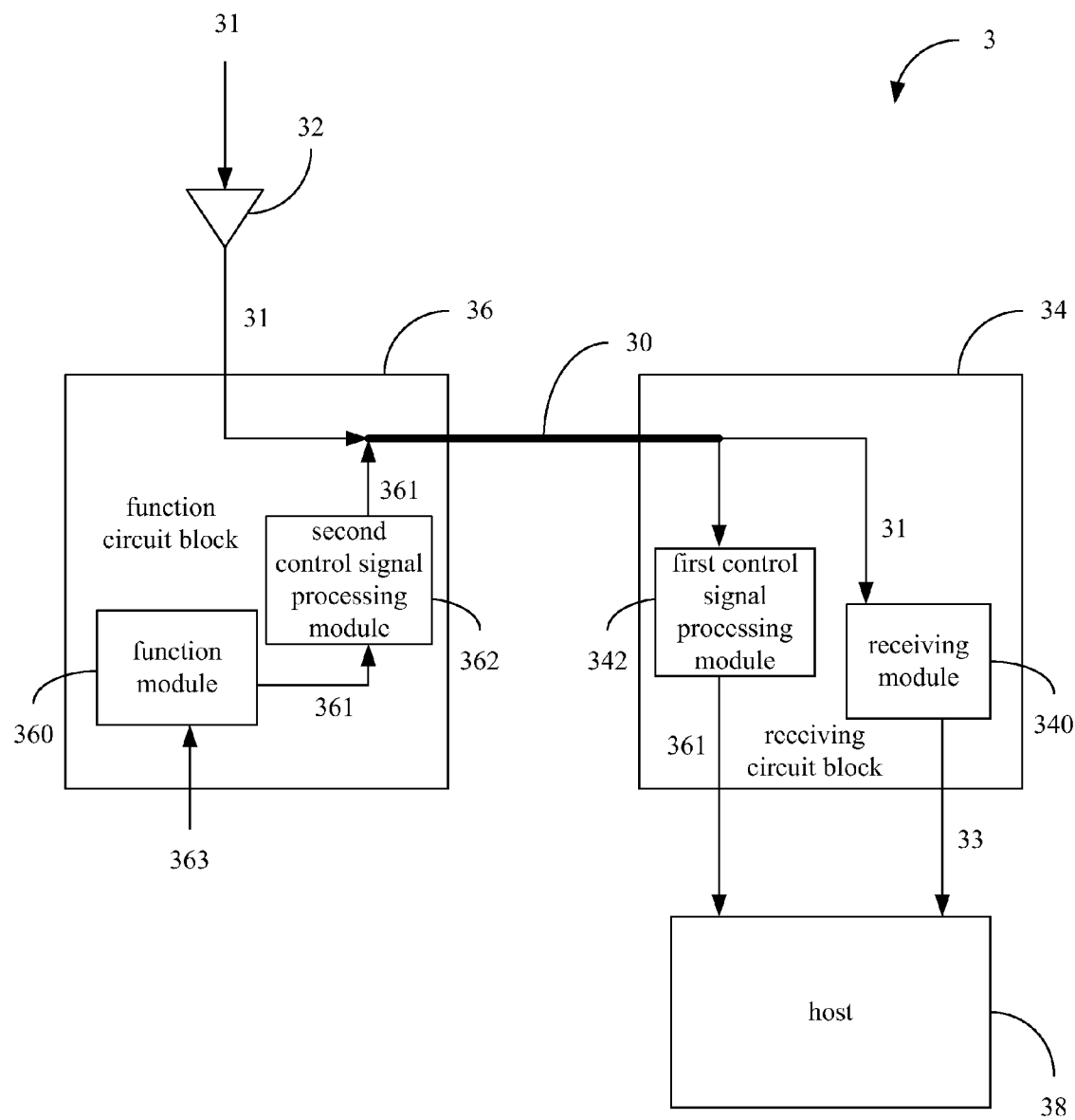
FIG. 3 is a block diagram of a data communication system of the second embodiment of the present invention.

Please refer to FIG. 3. FIG. 3 is a block diagram of the data communication system 3 of the second embodiment of the present invention. The data communication system 3 comprises a bidirectional cable 30, an antenna 32, a receiving circuit block 34 and a function circuit block 36. The bidirectional cable 30 and the antenna 32 are actually the same as the first embodiment. The function circuit block 36 in the present embodiment comprises a function module 360 and a second control signal processing module 362. The function module 360 is to generate a control signal 361. In the present embodiment, the function module 360 is an infrared signal receiver to receive an infrared signal 363 from a remote control (not shown) to generate the control signal 361 according to the infrared signal 363. In another embodiment, the function module 360 is a switch (not shown) to generate the control signal 361. The second control signal processing module 362 is to couple the control signal 361 to the low frequency band of the bidirectional cable 30. The receiving circuit block 34 comprises a receiving module 340 and a first control signal processing module 342. The receiving module 340 is to receive the analog data signal 31 from the high frequency band of the bidirectional cable 30 and converts the analog data signal 31 into a digital data 33 to a host 38. The first control signal processing module 342 is to decouple the control signal 361 from the low frequency band of the bidirectional cable 30 to make the host 38 perform an adjustment on the data communication system 3 according to the control signal 361. In an embodiment, the data communication system 3 is a system to receive the satellite TV data signal. Thus, the control signal 361 can make the host 38 switch the channel, control the format of the image data or other adjustment related to the satellite TV.

The data communication system of the present embodiment makes use of the low frequency band of the bidirectional cable to couple the control signal. Thus, only one cable between the function circuit block and the receiving circuit block is needed to avoid the additional spatial cost. It's noticed that the function module of the function circuit block can be different in other embodiments. Further, one can combine the first and the second embodiment to make the control signal transfer between the function circuit block and the receiving circuit block.

Figure 4:
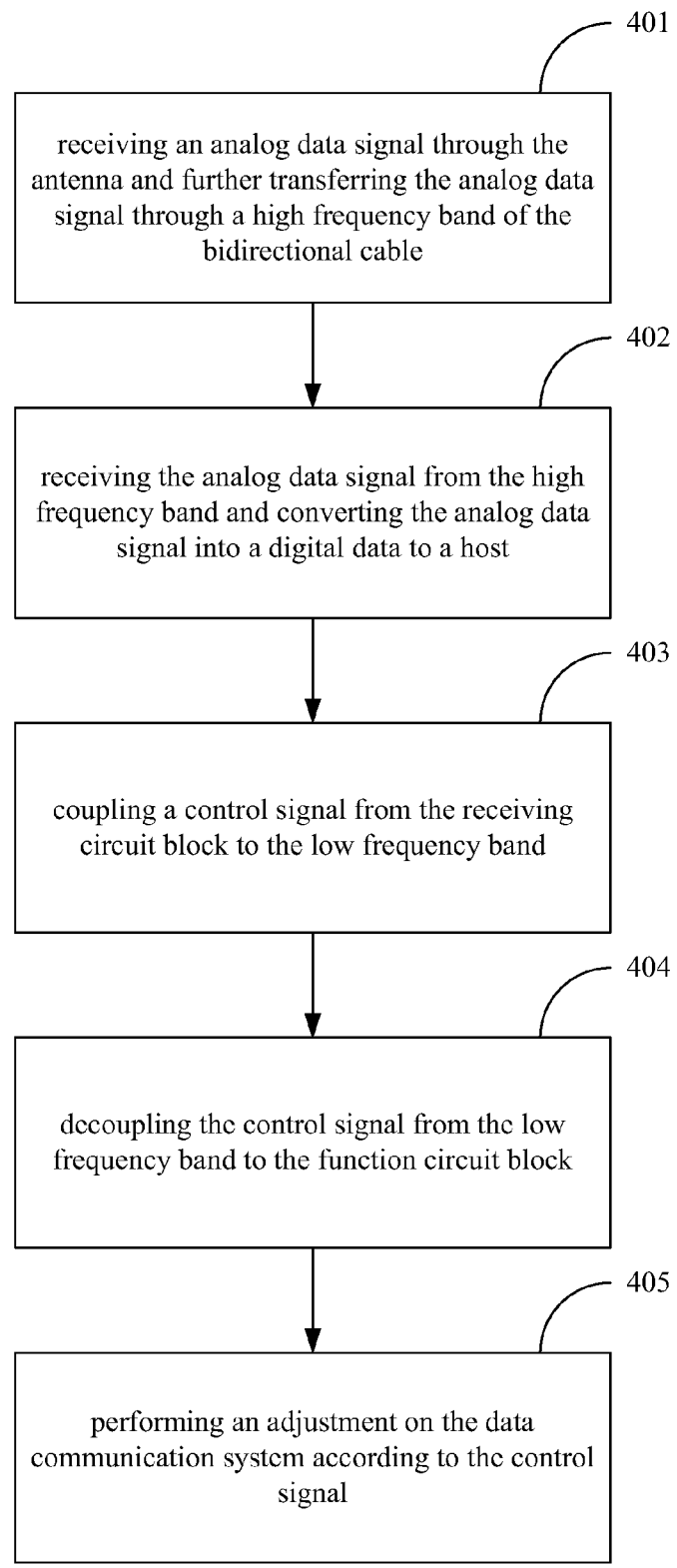
FIG. 4 is a flow chart of the data communication method of the third embodiment of the present invention.

Please refer to FIG. 4. FIG. 4 is a flow chart of the data communication method of the third embodiment of the present invention. The data communication method is adapted in the data communication system 2 described in the first embodiment. The data communication method comprises the steps of: in step 401, receiving an analog data signal through the antenna and further transferring the analog data signal through a high frequency band of the bidirectional cable; in step 402, receiving the analog data signal from the high frequency band and converting the analog data signal into a digital data to a host; in step 403, coupling a control signal from the receiving circuit block to the low frequency band; in step 404, decoupling the control signal from the low frequency band to the function circuit block; and in step 405, performing an adjustment on the data communication system according to the control signal.

Figure 5:
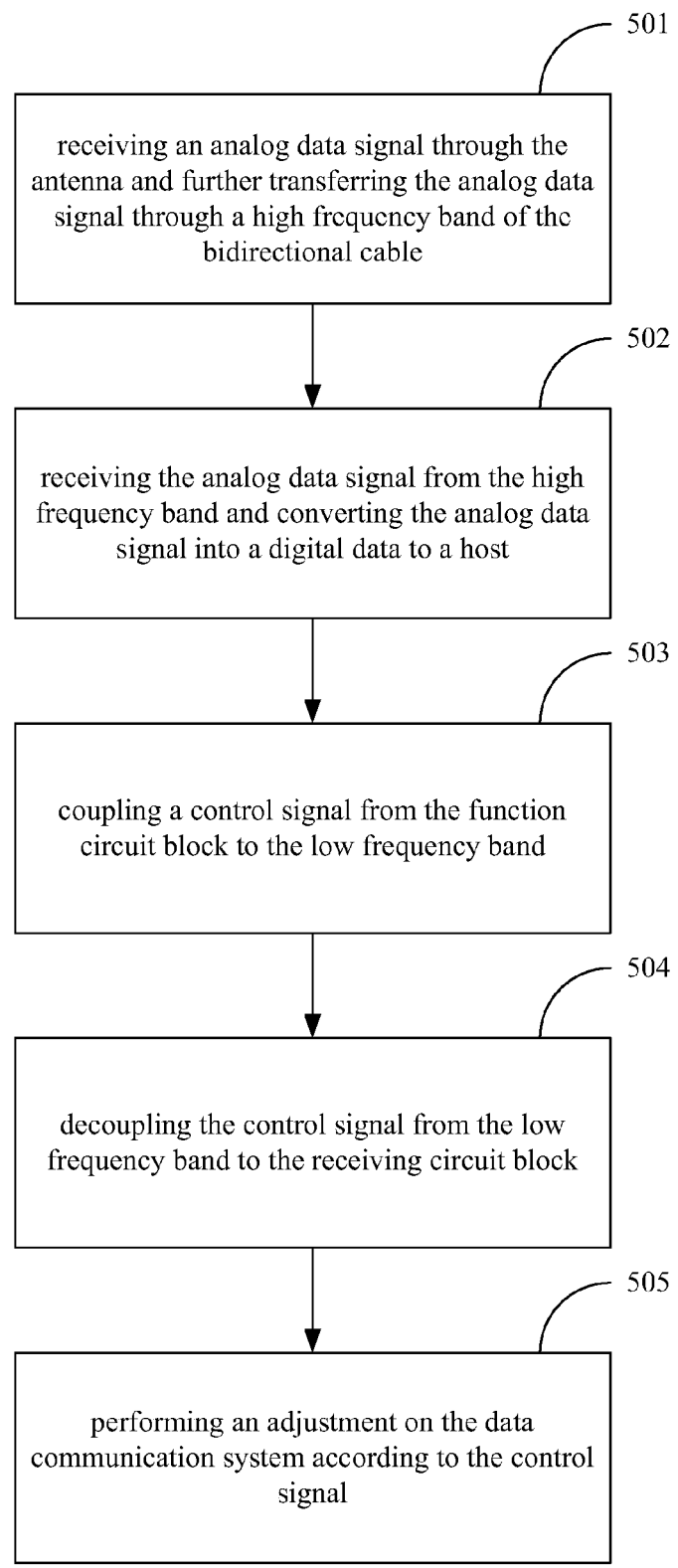
FIG. 5 is a flow chart of the data communication method of the fourth embodiment of the present invention.

Please refer to FIG. 5. FIG. 5 is a flow chart of the data communication method of the fourth embodiment of the present invention. The data communication method is adapted in the data communication system 3 described in the first embodiment. The data communication method comprises the steps of: in step 501, receiving an analog data signal through the antenna and further transferring the analog data signal through a high frequency band of the bidirectional cable; in step 502, receiving the analog data signal from the high frequency band and converting the analog data signal into a digital data to a host; in step 503, coupling a control signal from the function circuit block to the low frequency band; in step 504, decoupling the control signal from the low frequency band to the receiving circuit block; and in step 505, performing an adjustment on the data communication system according to the control signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A data communication system comprising:
   a bidirectional cable to transfer data through a high frequency band and a low frequency band;
   an antenna to receive an analog data signal and transfer the analog data signal through the high frequency band of the bidirectional cable;
   a receiving circuit block comprising:
   a receiving module to receive the analog data signal from the high frequency band and converts the analog data signal into a digital data to a host; and
   a first control signal processing module to couple a control signal to the low frequency band; and
   a function circuit block comprising:
   a second control signal processing module to decouple the control signal from the low frequency band; and
   a function module to further perform an adjustment on the data communication system according to the control signal.

2. The data communication system of claim 1, wherein the host generates the control signal and sends the control signal to the first control signal processing module, the function module is a power module to perform a power adjustment on a low noise block (LNB).

3. The data communication system of claim 2, further comprising a buffer, the host substantially sends the control signal to the first control signal processing module through the buffer.

4. The data communication system of claim 1, wherein the second control signal processing module comprises a low pass filter to decouple the control signal from the low frequency band.

5. The data communication system of claim 1, further comprising a first DC (direct current) blocking circuit and a second DC blocking circuit, wherein the first DC blocking circuit is connected between the receiving module and the bidirectional cable to block a direct current between the receiving module and the bidirectional cable, the second DC blocking circuit is connected between the antenna and the bidirectional cable to block a direct current between the antenna and the bidirectional cable.

6. The data communication system of claim 5, wherein the first and the second DC blocking circuit are a capacitor respectively.

7. The data communication system of claim 1, wherein the first and the second control signal processing module are an inductor respectively.

8. A data communication method adapted in a data communication system, wherein the data communication system comprises an antenna, a receiving circuit block, a function circuit block and a bidirectional cable connected between the receiving and the function circuit block, the data communication method comprises the steps of:
   receiving an analog data signal through the antenna and further transferring the analog data signal through a high frequency band of the bidirectional cable;
   receiving the analog data signal from the high frequency band and converting the analog data signal into a digital data to a host;
   coupling a control signal from the receiving circuit block to the low frequency band;
   decoupling the control signal from the low frequency band to the function circuit block; and
   performing an adjustment on the data communication system according to the control signal.

9. The data communication method of claim 8, wherein the host generates the control signal and sends the control signal to the first control signal processing module, the function circuit block comprises a power module to perform a power adjustment on a low noise block (LNB).

* * * * *